(12) United States Patent  (10) Patent No.: US 8,190,806 B2
Petrick et al.  (45) Date of Patent: May 29, 2012

(54) SYSTEM FOR MAINTAINING LARGE NUMBERS OF HANDHELD ELECTRONIC DEVICES

(75) Inventors: Matthew Petrick, Oak Park, IL (US); John Jaqua, LaPorte, IN (US); John Poremba, Elmhurst, IL (US); Peter Hefner, Deerfield, IL (US); Mark Anthony Kinsley, Elmhurst, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 0 days.

(21) Appl. No.: 12/909,543

(22) Filed: Oct. 21, 2010

(65) Prior Publication Data

US 2011/0035525 A1  Feb. 10, 2011

Related U.S. Application Data

(62) Division of application No. 11/978,313, filed on Oct. 29, 2007, now Pat. No. 7,844,770.

(60) Provisional application No. 60/856,257, filed on Nov. 2, 2006, provisional application No. 60/936,834, filed on Jun. 22, 2007.

(51) Int. Cl.
*G06F 13/00* (2006.01)
(52) U.S. Cl. .................... 710/303; 361/679.56
(58) Field of Classification Search ............... 713/300; 710/300–304, 313; 361/679.01, 679.02, 361/679.3, 679.55, 679.56, 679.57, 724, 361/726, 727, 807, 810; 320/107, 138
See application file for complete search history.

(56) References Cited

U.S. PATENT DOCUMENTS

| | | | | |
|---|---|---|---|---|
| 5,611,553 | A * | 3/1997 | Schoeman et al. | 280/47.35 |
| 6,008,621 | A * | 12/1999 | Madison et al. | 320/107 |
| 6,218,796 | B1 * | 4/2001 | Kozlowski | 318/280 |
| 6,614,206 | B1 * | 9/2003 | Wong et al. | 320/136 |
| 7,055,833 | B2 * | 6/2006 | Wixted et al. | 280/47.34 |
| 7,325,891 | B1 * | 2/2008 | Kinsley et al. | 312/257.1 |
| 7,595,995 | B2 * | 9/2009 | Hock | 361/727 |
| 7,631,111 | B2 * | 12/2009 | Monks et al. | 710/15 |
| 7,701,168 | B2 * | 4/2010 | Thijssen | 320/111 |
| 2005/0110461 | A1 * | 5/2005 | McConnell et al. | 320/116 |
| 2005/0174094 | A1 * | 8/2005 | Purdy et al. | 320/134 |
| 2005/0253554 | A1 * | 11/2005 | DiFazio et al. | 320/114 |
| 2006/0179165 | A1 * | 8/2006 | Chen | 710/5 |
| 2006/0200599 | A1 * | 9/2006 | Manchester et al. | 710/62 |
| 2008/0061736 | A1 * | 3/2008 | Ho | 320/111 |

* cited by examiner

*Primary Examiner* — Glenn A Auve
(74) *Attorney, Agent, or Firm* — Anderson Gorecki & Manaras LLP

(57) ABSTRACT

A system for maintaining a large number of Handheld Electronic Devices (HEDs) includes a drawer having a divider structure configured to define compartments that are sized to hold the HEDs while the HEDs are stored in the drawer. A 20 port USB hub is provided in the drawer so that 20 HEDs may be connected to the USB hub while stored in the drawer. The USB hub allows the HEDs to be charged at a low rate while being synchronized with a computer and at a high rate when not being synchronized. The USB hub is designed using a tree structure of available USB hub chips to enable a larger number of USB ports. A microcontroller is provided to control the manner in which the computer is allowed to recognize the HEDs connected to the USB ports.

7 Claims, 9 Drawing Sheets

SYSTEM FOR MAINTAINING LARGE NUMBERS OF HANDHELD ELECTRONIC DEVICES

CROSS-REFERENCE TO RELATED APPLICATIONS

This application is a divisional of U.S. patent application Ser. No. 11/978,313, filed Oct. 29, 2007, which claims priority to U.S. Provisional Patent Application No. 60/856,257, filed Nov. 2, 2006, U.S. Design patent application No. 29/273,354, filed Mar. 2, 2007, and U.S. Provisional Patent Application No. 60/936,834, filed Jun. 22, 2007. The content of each of these applications is hereby incorporated herein by reference.

BACKGROUND OF THE INVENTION

1. Field of the Invention

The present invention relates to a system for maintaining a large number of Handheld Electronic Devices (HEDs).

2. Description of the Related Art

Portable handheld devices that are capable of storing content such as music and video have recently become popular. For example, devices such as the iPOD™ from Apple are popular devices that are commonly used to store music and/or video files. The music may then be played on demand either through earphones, or through another stereo device via a docking station. As used herein, the term "Handheld Electronic Device or (HED)" will be used to refer to a portable and handheld digital electronic device for recording, organizing, transmitting, manipulating and reviewing text, data, audio, image, and video files.

Although iPODs and other HEDs were initially made popular in connection with users that wanted to be able to have a portable music library, such HEDs are now being used for other purposes. For example, museums are starting to load audio and/or audio/video museum tours on HEDs such as iPODs so that users can listen to and/or watch a guided program as they proceed through the museum. Such guided programs are commonly used to enable a person knowledgeable about art to narrate a guided tour one time, and then enable museum patrons to obtain the benefit of the guided tour at a later time by listening to the pre-recorded guided tour.

In addition to museums, other forums are also beginning to use HEDs such as iPODs to provide users with content. For example, a conference may provide a conference attendee with a HED to provide the conference attendees with information about the conference. Similarly, a resort may provide a person with a HED when the person arrives at the resort to enable the person to listen to a program about the resort.

As companies, museums, individuals, and other institutions start to collect large numbers of HEDs, the manner in which the HEDs are maintained becomes important. For example, if a museum would like to open a new exhibit and provide a new guided program for the new exhibit, the museum will need to load new content onto their HEDs. Similarly, the museum will need to recharge the HED batteries periodically to enable the HEDs to be capable of functioning as the users roam throughout the museum. Accordingly, it would be desirable to provide a system that would enable users to maintain a large number of Handheld Electronic Devices.

SUMMARY OF THE INVENTION

A system for maintaining a large number of Handheld Electronic Devices includes a drawer having circuitry configured to connect to the Handheld Electronic Devices to enable the HEDs to be charged and synchronized. The drawer may have a divider structure configured to create compartments configured to hold HEDs in the drawer to prevent them from sliding around in the drawer. In one embodiment, the drawer structure includes a central area configured to hold the circuitry for charging and synchronizing the HEDs, and the divider structure is configured to provide slots on either side of the central area so that two rows of HEDs may be contained in each drawer. The HEDs may be connected to the circuitry via Universal Serial Bus (USB) or other connectors, to enable the HEDs to receive power from the circuitry and to receive content via the circuitry.

The circuitry may enable signals from a laptop computer or other computer to be used to provide new data to the HEDs so that the HEDs may be synchronized to include new information as directed by the laptop computer. The circuitry may be implemented as a 20 port USB hub so that 20 HEDs may be connected to the USB hub while stored in the drawer. The USB hub allows the HEDs to be charged at a low rate while being synchronized with a computer and at a high rate when not being synchronized. The USB hub is designed using a tree structure of available USB hub chips to enable a larger number of USB ports to be implemented on a printed circuit board without designing and fabricating an ASIC to handle the larger number of ports. A microcontroller is provided to control the manner in which the computer is allowed to recognize the HEDs connected to the USB ports, so that not all of the HEDs are immediately visible to the computer when the computer is connected to the USB hub.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and dimensions have not been described in detail so as not to obscure the invention.

Figure 1:
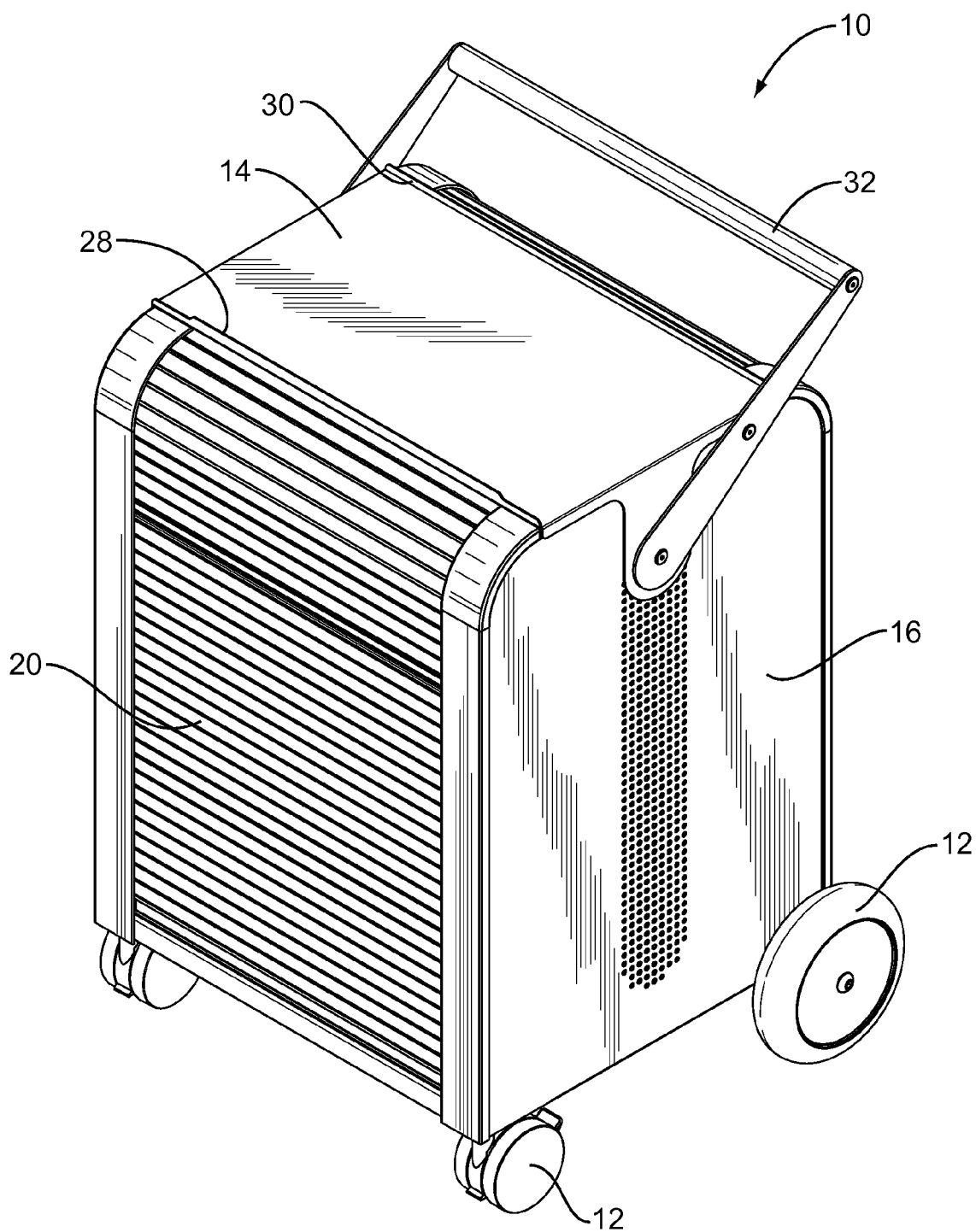
FIG. 1 is a front perspective view of a cart for maintaining a large number of Handheld Electronic Devices (HEDs) according to an embodiment of the invention.

FIG. 1 illustrates an embodiment of a cart 10 for maintaining a large number of Handheld Electronic Devices (HEDs) according to an embodiment of the invention. As shown in FIG. 1, the cart generally is formed as a cabinet having wheels 12 that are configured to enable the cart to be mobile. The wheels may be castors such as the front wheels shown in FIG. 1 or may be directionally fixed wheels such as the rear wheels shown in FIG. 1. Other types of wheels may be used as well and the invention is not limited to the particular wheels shown in FIG. 1.

Figure 2:
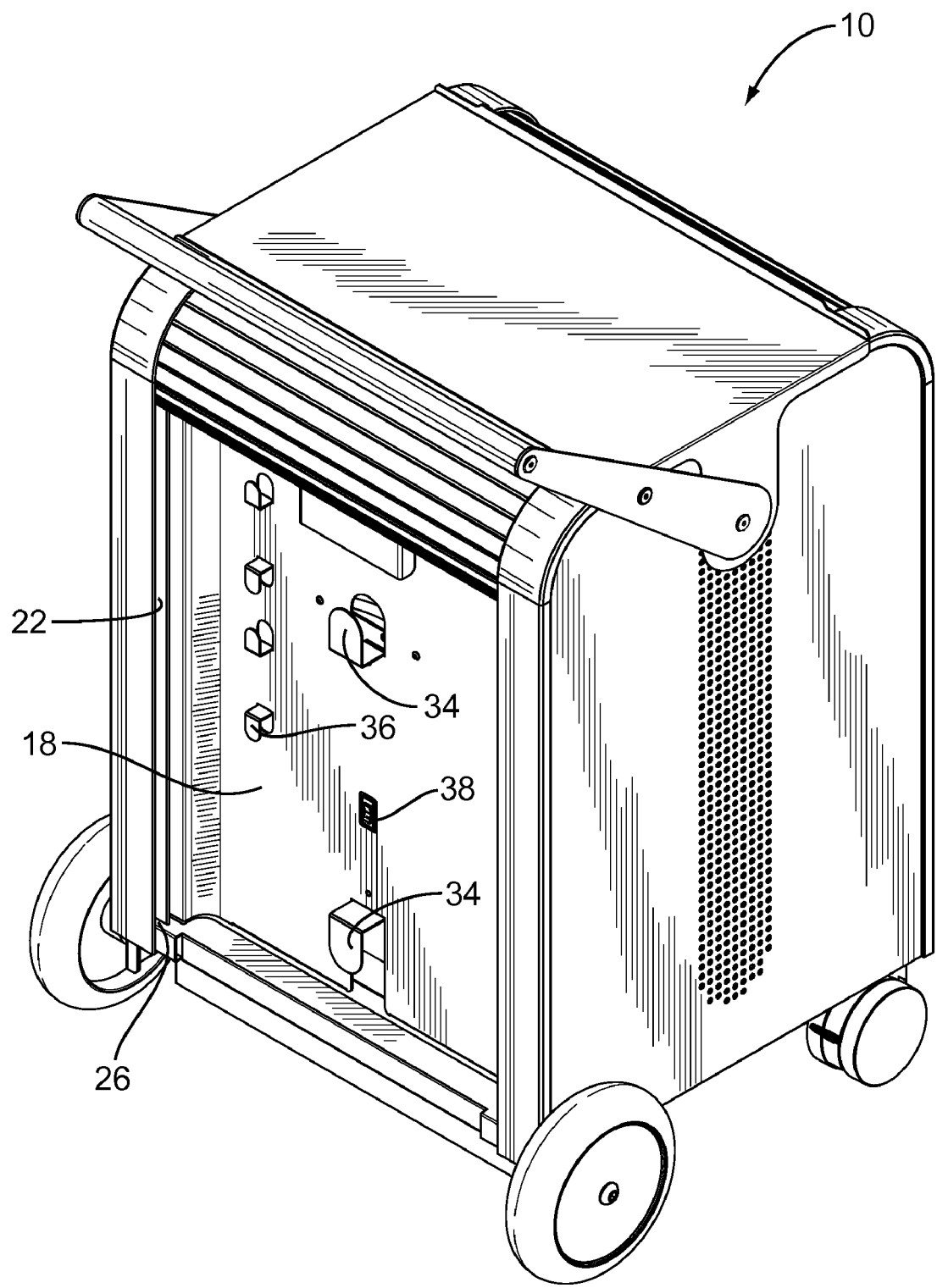
FIG. 2 is a back perspective view of the cart of FIG. 1 according to an embodiment of the invention.
Figure 3:
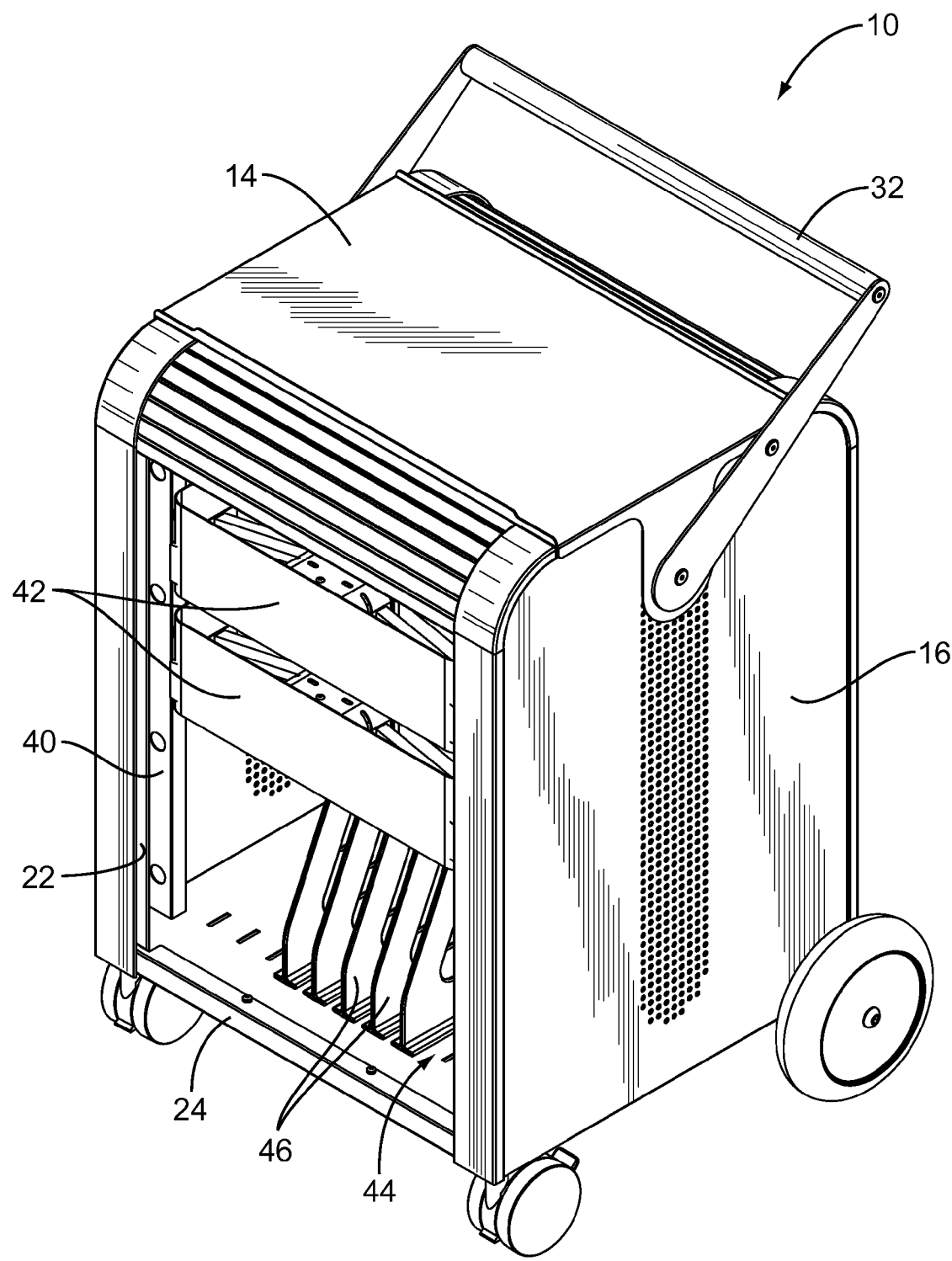
FIG. 3 is a front perspective view of the cart of FIG. 1 with the roll-away front panel opened to access drawers configured to contain the HEDs according to an embodiment of the invention.
Figure 4:
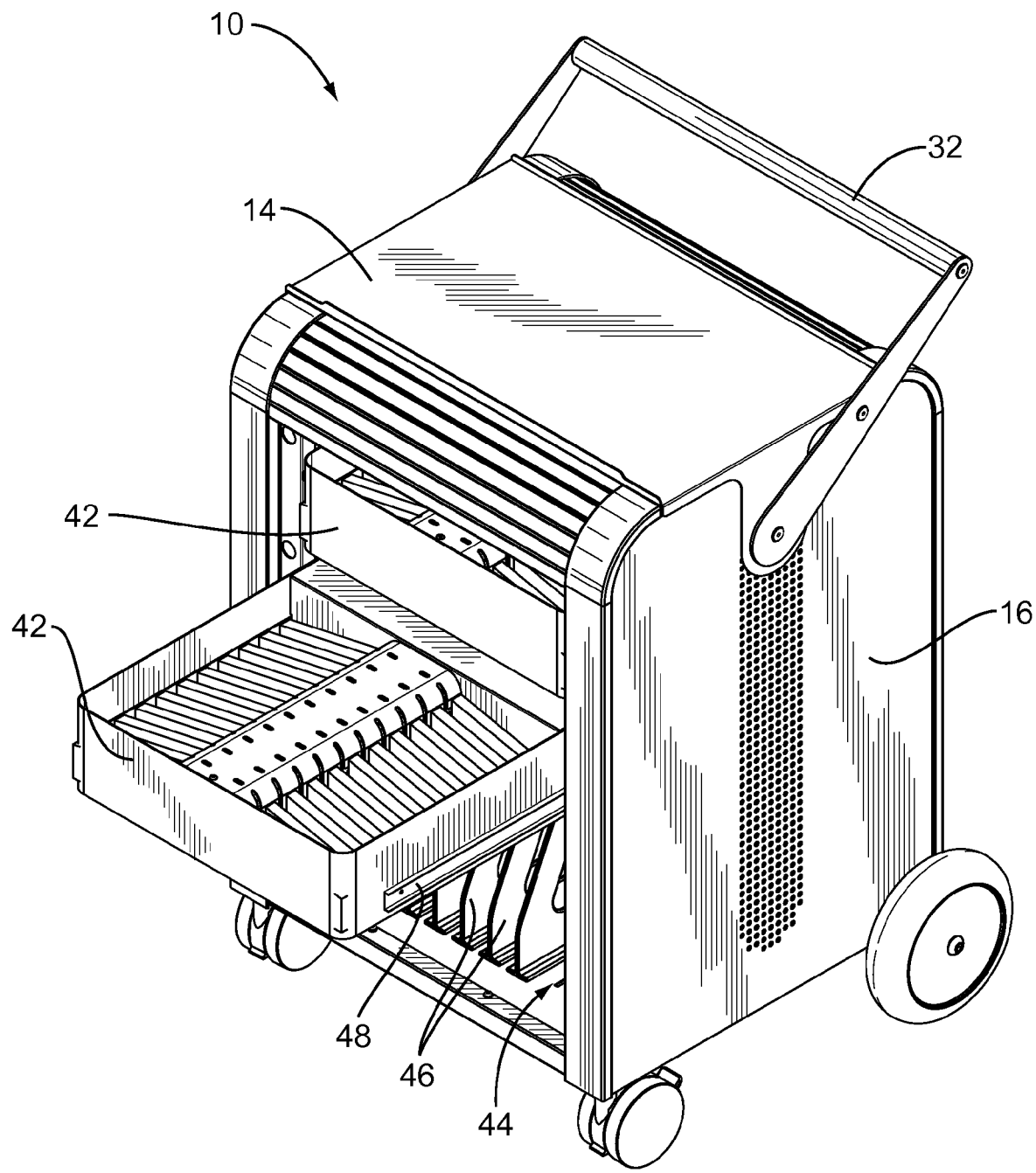
FIG. 4 is a front perspective view of the cart of FIG. 3 with one drawer extended according to an embodiment of the invention.

The interior of the cart is enclosed by a skin including a top panel 14, side panels 16, a back panel 18 (see FIG. 2), and a roll-away panel 20 configured to slide in a channel 22 that extends from the bottom front edge 24 of the cart 10 to the rear bottom edge 26 of the cart 10. To open the cart, the roll-away panel slides along the channel 22 from a front position in which the front of the cart is closed by the roll-away panel, to a back position in which the roll-away panel is located in the channel along the rear side of the cart. By moving the roll-away panel along the channel the front of the cart may be opened as shown in FIG. 3.

The roll-away panel may be formed from a series of interlocking slats that are flexibly coupled to one another along their length (or at defined positions along their length) to enable the slats to pivot longitudinally relative to each other. Similar panels formed from multiple slats have been used in desks such as roll-top desks, in which wooden slats are used to enclose a top area of the desk. The slats in the cart shown in FIG. 1 may be made of plastic, metal, or a combination of materials depending on the particular implementation of the cart and the invention is not limited to the particular materials used to implement the roll-away panel of the cart.

The top panel 14 is basically flat, with the exception of a front lip 28 and a rear lip 30. The front and rear lips are configured to define a top area on which a laptop computer or other computer may be placed when connecting to the handheld electronic devices contained within the cart 10. The front and rear lips enable the top area to be defined such that objects placed on the top of the cart are less likely to fall off of the top.

The cart may be provided with a handle 32 to enable a person to push/pull the cart when it is necessary to move the cart. The invention is not limited to the particular handle structure shown in FIG. 1, as many different handle structures may be used to implement embodiments of the invention.

The side panels 16 of the cart 10 may be perforated to enable the interior of the cart to be ventilated. Other ventilation structures may be used as well, such as venting channels as shown in co-pending U.S. patent application Ser. No. 11/592,097, filed Nov. 2, 2006, and entitled "Computer Cart". This patent also describes the structure of the dividers 46 and shelf 44 (described below), and other components that may be incorporated into the cart 10. The content of this patent and the description of these particular components is hereby incorporated herein by reference The rear panel 18, shown in greater detail in FIG. 2, may be provided with one or more sets of hooks 34 designed to hold power cords and/or hooks 36 designed to computer cables. For example, a 9 foot long USB cable having two male ends (Type A male, Type B male) may be provided to interconnect each drawer with a laptop computer or desktop computer stored in the cart or placed on top of the cart. The cable can be unwound from the hooks and plugged into a computer to enable the computer to connect to HEDs stored within the cart and connected to the USB hub that forms part of the drawer. The USB hub aspect is described in greater detail below. Other cables may be used as well and the invention is not limited to use with particular USB cables. Optionally an on/off switch 38 may also be provided to enable the cart to be plugged into a wall outlet and then selectively turned on/off to enable the operator to determine when the HEDs stored within the cart should be charged.

The channel 22 may be integral with the frame forming part of the structural support of the cart or may be a separate component that is connected to a supporting frame. There are many ways of forming a structural frame for a cart such as the cart shown in FIG. 1, and the invention is not limited to any particular frame structure. For example, FIG. 3 shows a portion of the frame structure 40 configured to provide a racking system to hold one or more drawers which are described in greater detail below. The channel 22, in this embodiment, is thus connected to the side panel 16, although the invention is not limited to this particular embodiment.

FIG. 3 shows the internal structure of the cart according to an embodiment of the invention. As shown in FIG. 3, the cart may contain one or more drawers 42, each of which is configured to hold multiple HEDs. The embodiment shown in FIG. 3 has two drawers, however the cart may have a larger or smaller number of drawers depending on the particular needs of the institution that has ordered the cart. The cart may also have one or more shelves 44 containing dividers 46 to enable one or more laptop computers to also be stored in the cart 10. Optionally, a power charging strip may be provided in the cart to enable the computers to be plugged in to charge while stored in the cart 10.

The drawers 42 are disposed on glides 48 that will enable the drawer to extend out of the front opening of the computer cart. Providing drawers that extend in this manner facilitates placement of the HEDs into the cart. Additional details of the drawer structure are provided in greater detail below.

The cart, according to an embodiment of the invention, may be designed to enable multiple HEDs to be updated with new information, such as from a laptop computer, and to also enable the multiple HEDs to be recharged while stored in the cart. One manner in which this may occur is described in greater detail below.

Figure 5:
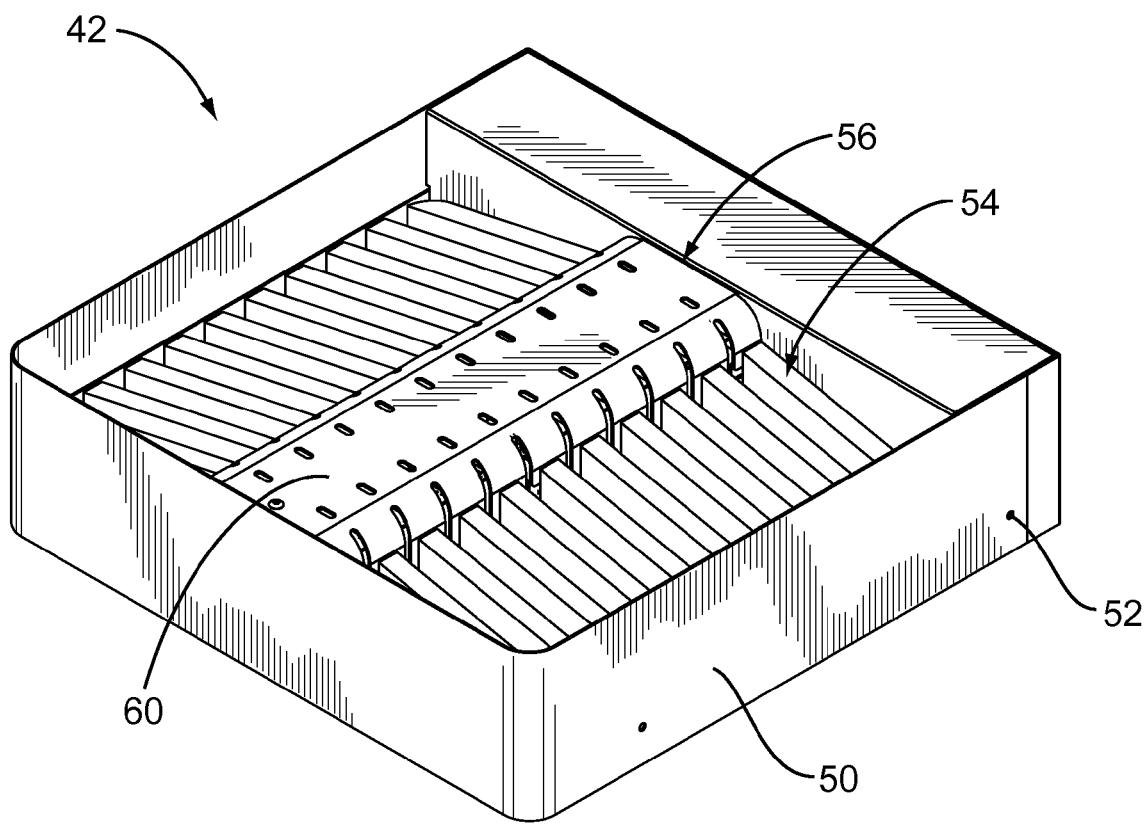
FIG. 5 is a front perspective view of a drawer removed from the cart according to an embodiment of the invention.
Figure 6:
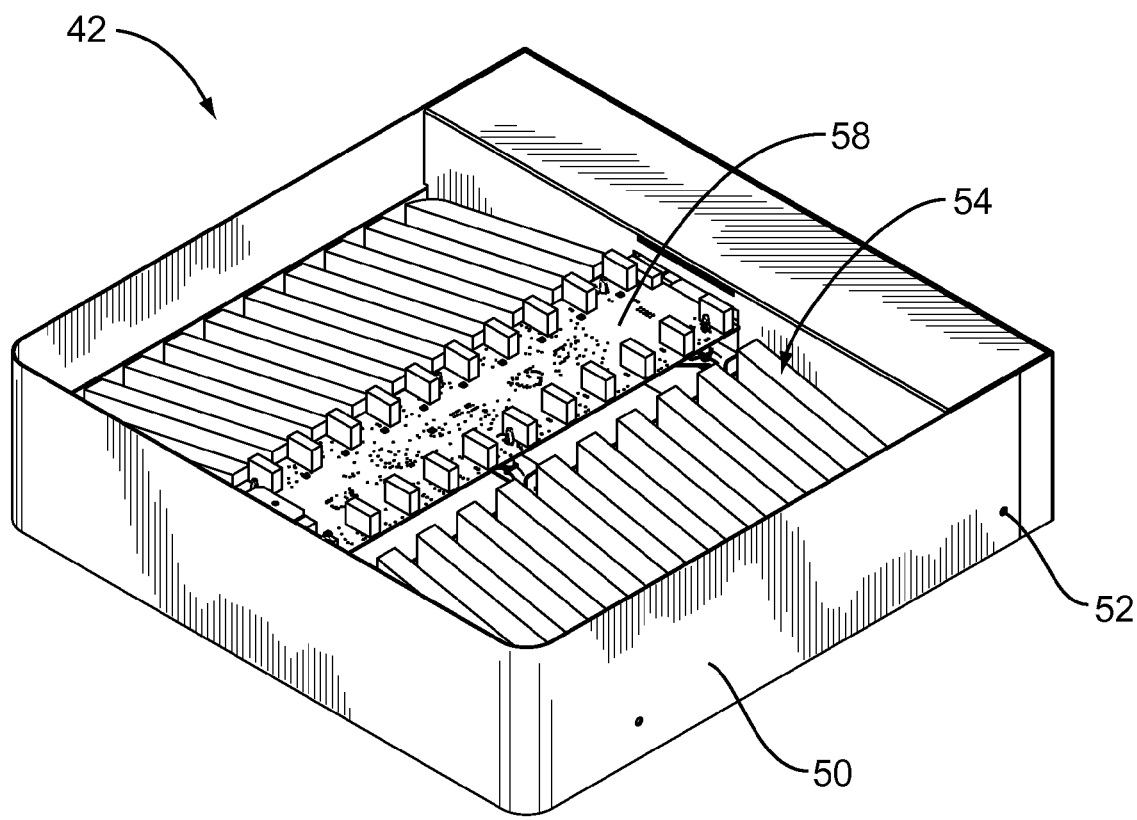
FIG. 6 is a front perspective view of a drawer of FIG. 5 with a protective cover removed to reveal an electronic circuit board in the interior of the drawer according to an embodiment of the invention.
Figure 7:
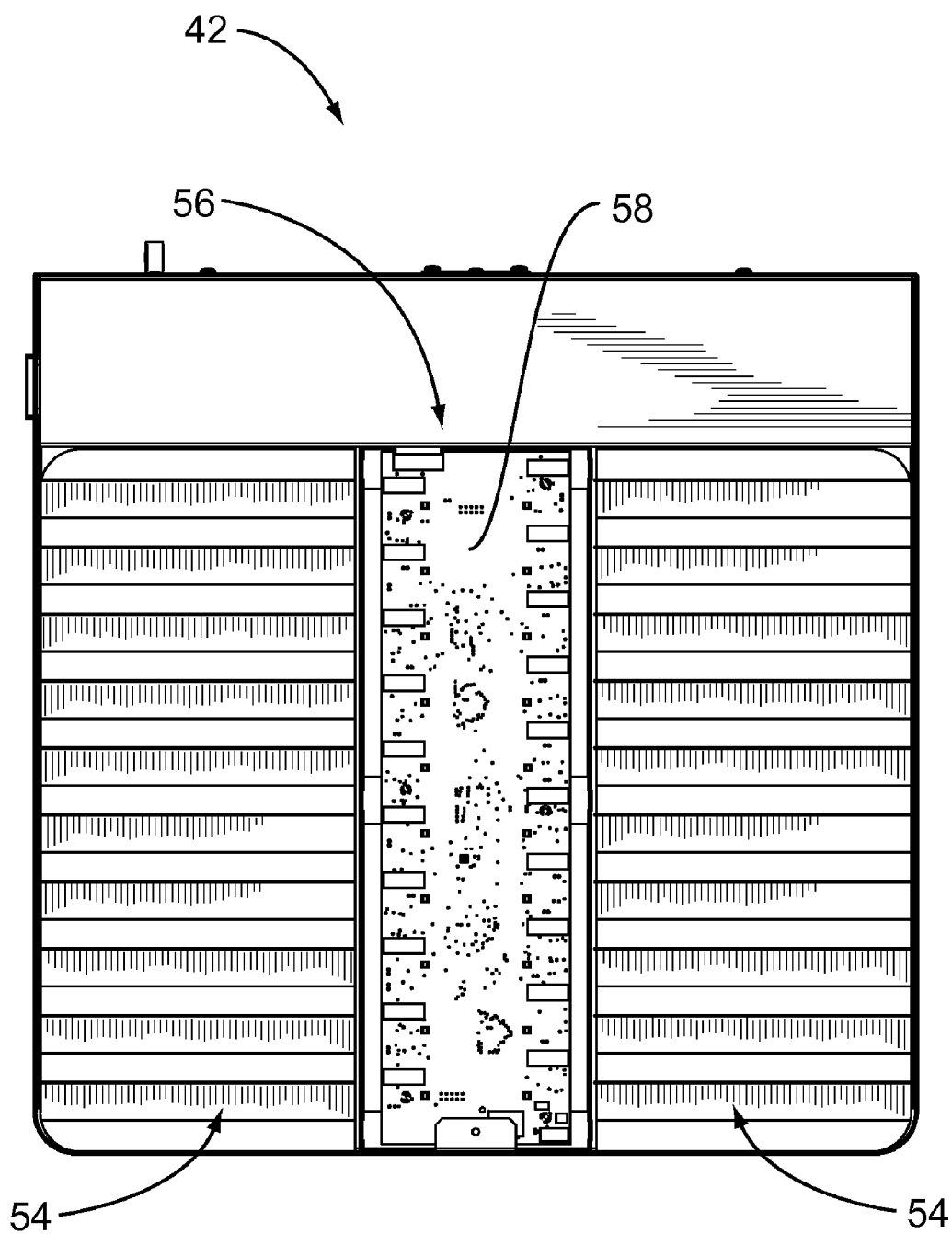
FIG. 7 is a top plan view of the drawer of FIG. 6 according to an embodiment of the invention.

FIGS. 5 and 6 illustrate an example drawer structure that may be used as the drawers 42 in cart 10. In the embodiment shown in FIGS. 5 and 6, the drawer includes an edge band 50 defining a perimeter of the drawer. Holes 52 may be formed in the edge band 50 to enable the drawer to be attached to the glides 48. Other methods of attaching the glides may be used as well. The drawer may also include a bottom plate (not shown) defining a bottom of the drawer so that things placed within the drawer will not fall out of the drawer. Alternatively the divider structure (described below) may be connected to the edge band and define the bottom of the drawer.

As shown in FIG. 5, a divider structure 54 is included in the drawer 42 to define individual compartments sized to hold Handheld Electronic Devices (HEDs). The divider structure may be implemented using a soft material such as foam or other cushioning material that will cushion the HEDs while they are maintained in the drawer to minimize the amount of jarring that is transferred from the cart to the HEDs. Example HEDs include MP-3 players such as iPOD™ HEDs available from Apple Computer Corp. and other types of HEDs. As new HEDs are developed, differently sized dividers may be provided to securely hold the HEDs so that they may be retained within the drawer in a safe and secure manner.

A central area of the drawer 56 contains an electrical circuit board 58 shown in FIG. 6, to which the HEDs may be connected when placed in the drawer. The electrical circuit board 58 may be covered by a cover 60 (made of plastic, metal, or another material) to prevent accidental contact by a user. A rear enclosed area of the drawer may contain the power supply components, such as a power transformer, that may be used to step down the line current coming into the cart 10 from a wall outlet, and to condition the power for transmission to the circuit board. Power supplies are well known in the art and the invention is not limited to the use of a particular type of power supply.

The electrical circuit board, according to an embodiment of the invention, is configured as a 20 port USB hub that will enable HEDs connected to the electrical circuit board to be charged as well as synchronized with a laptop computer or other data source. Although a 20 port USB hub will be described as being a preferred embodiment, the invention is not limited to this particular hub as other numbers of USB ports may be included on the USB hub. When the laptop computer is connected to the board to synchronize the programs in the HEDs, the circuit board is configured to charge the HEDs at a first, low rate. However, when the laptop computer is not connected to the board and the HEDs are therefore not being synchronized, the circuit board is configured to charge the HEDs at a faster rate by increasing the amount of power that is provided to the HEDs via the USB hub. For example, when the HEDs are being synchronized they may be charged at 100 milliamps, and when they are not being synchronized they may be charged at 500 milliamps. By providing two different current levels, depending on whether the HEDs are being synchronized, the HEDs may be quickly charged or, alternatively, simultaneously synchronized and more slowly charged.

Figure 10:
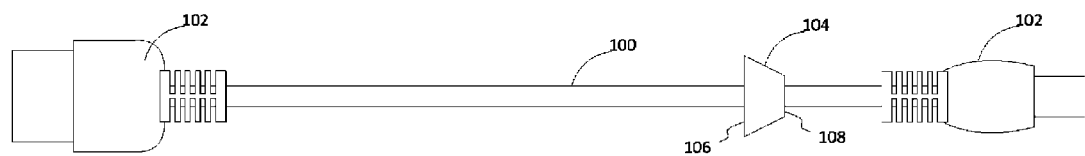
FIG. 10 illustrates a cable that may be used to interconnect a HED with the electrical circuit board.

USB cables extending through slots in the cover 60 may be connected to the USB hub within the central area and have free ends that allow the USB cables to be available to connect to HEDs when disposed in the drawer. The USB cable may have a stopper molded into the cable to hold the cable relative to the cover so that lateral force exerted on the cable such as by pulling the cable will be transferred to the stopper rather than to the connection between the USB cable and the USB hub. FIG. 10 illustrates one example of a USB cable that may be used. As shown in FIG. 10, the USB cable 100 has connectors 102 on each end. The connectors may be type A male and type B male connectors or may be other connectors specified according to the USB standard. Where a standard other than the USB standard is being used, the connectors may be formed according to that standard. A stopper 104 is formed intermediate the two ends and designed to engage a slot in the cover 60 such that the stopper 104 will substantially prevent the cable from being pulled out of the slot beyond where the stopper is connected to the cable 100. Of course, given sufficient force, it may be possible to cause the cable to be yanked out of the cover 60—the stopper 104 is thus designed to inhibit a person from inadvertently pulling too hard on the cable rather than prohibit someone from intentionally yanking the cable out of the cover. The stopper 104 may be molded integral with the cable 100, may be connected to the cable after creation, or otherwise adhered/attached to the cable 100. The invention is not limited to the particular manner in which the stopper is attached to the cable. The stopper, in one embodiment, is formed as a frusto-conical form having a conical form with a base 106 and top 108 cut off parallel to the base.

Figure 8:
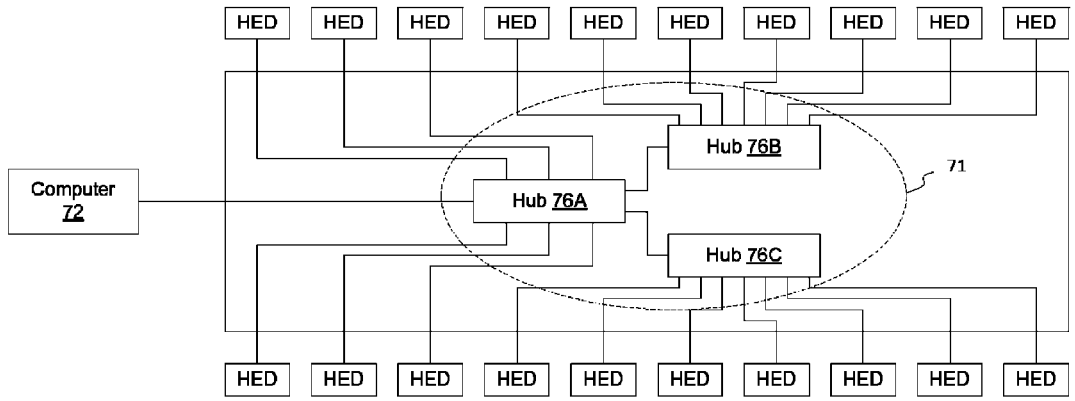
FIGS. 8 and 9 show an embodiment of an electrical circuit board 58 configured to enable 20 HEDs to be charged and synchronized according to an embodiment of the invention.
Figure 9:
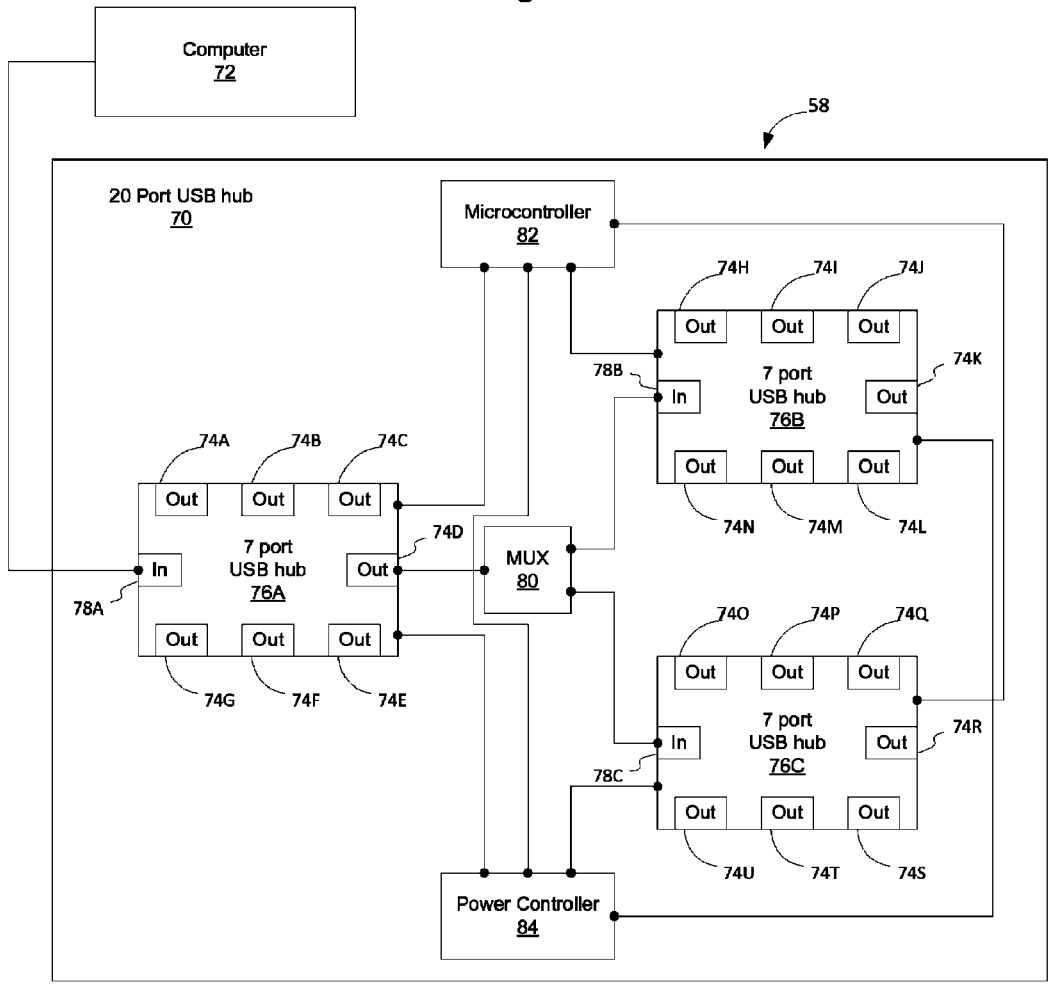

FIGS. 8-9 show an embodiment of a 20 port USB hub 70 that will enable multiple HEDs to be connected to a computer 72 so that the HEDs and computer may be synchronized. For example, the computer 72 may download content to the multiple HEDs simultaneously so that the content may be provided to HED users. FIG. 9 shows an overview of the structure of the USB hub 70 in which multiple smaller commercially available USB hub circuits are arranged in a tree structure 71. By utilizing commercially available circuits in the unique tree-structure arrangement, it is possible to implement a much larger port count USB hub than would otherwise be possible using a single USB hub ASIC. Although a 20 port USB hub has been shown, the invention is not limited to an implementation that includes 20 ports as a hub having a different numbers of ports my be created using the same tree structure as well. In practice, the number of USB ports able to be implemented on a given hub may be limited by the USB standard, although as the standard evolves the number may be increased.

In the tree structure 71 shown in FIG. 8, the tree has a root hub 76A and two leaf hubs 76B and 76C. The invention is not limited to an embodiment having two leaf hubs as other numbers of leaf hubs may be used as well. Similarly, although the embodiment shown in FIG. 8 has one layer of leaf hubs other layers of leaf hubs may be used as well. For example, in another embodiment it may be possible to chain another one or more hubs off hub 76B or hub 76C to enable a larger number of hubs to be chained together in the tree structure 71.

FIG. 9 shows the electrical circuit board 58 in greater detail, which is configured to enable 20 HEDs to be charged and synchronized according to an embodiment of the invention. As shown in FIG. 9, the electrical circuit board 58 implements a 20 port USB hub 70 to enable a computer 72 to connect to multiple HEDs 73 via output ports 74. According to an embodiment of the invention, a first 7 port USB hub 76A is chained together with two other 7 USB hubs 76B and 76C to form a 20 port USB hub formed as a tree structure with 20 available output ports 74.

Specifically, the first USB 76A has an input port 78A and seven output ports 74A-74G. Output port 74D is connected to multiplexer 80 which has two outputs, a first of which connects to input port 78B on 7 port USB hub 76B and a second of which connects to input port 78C on 7 port USB hub 76C. 7 port USB hub 76A has six available output ports 74A-74C and 74E-74G that may be used to connect with HEDs. Similarly, 7 port USB hub 76B has seven output ports 74H-74N that may be used to connect with HEDs and 7 port USB hub 76C has seven output ports 74O-74U that may be used to connect with HEDs. In total, therefore, there are 20 available output ports to connect with HEDs resulting in a 20 port USB hub.

The 7 port USB hubs 76A-C are commercially available ASICs. Thus, by using several available chips and interconnecting the chips via a multiplexor 80, it was possible to implement a 20 port hub on an integrated circuit board without going through the process of creating a dedicated ASIC or FPGA to implement the 20 port hub. Although the 7 port hubs are described as having input ports and output ports, the USB standard actually specifies bi-directional communication ports and, as such, the commercially available ASICs that are used to implement the 7 port USB hubs are actually bi-directional. They were labeled in and out because, when information is being passed from computer 72 to the 20 port USB hub 70, data will flow via USB cable 86 into port 78A and out ports 74A-74G. HEDs may be connected to ports 74A-74C and 74E-74G to receive data from the computer 72. Data will also flow via port 74D to MUX 80 and from MUX 80 into ports 78B and 78C. The data will then flow out of ports 74H-74N and 74O-74U to arrive at any HEDs connected to those ports. Thus, the labels applied to the ports are for convenience of explanation and have no physical significance since data can flow into and out of all of the ports.

The 20 port USB hub 70 according to an embodiment of the invention is configured to both synchronize and charge HEDs connected to ports 74. A microcontroller 82 is provided to control operation of the USB hub to enable the hub to operate differently depending on whether the HEDs are being synchronized or not. These two modes will be referred to herein as synchronizing mode and charging mode. During synchronizing mode content 90 from the computer 72 is synchronized with HEDs connected to ports 74. The content may be moved from the computer to the HEDs, or received from the HEDs and stored in the computer. Although it is envisioned that the content would often be disseminated from the computer 72, the invention is not limited in this manner as the hub may be used in myriad ways to enable the HEDs to exchange information. The synchronizing mode will therefore refer to a mode in which data is being transmitted between the computer and HEDs, or between the HEDs themselves. During synchronizing mode a low power charge will also be available to the HEDs, such as 100 milliamps.

Charging mode is the second mode of operation in which the amount of power transmitted to the HEDs is at a higher value, such as the maximum power allowed under the USB standard (500 milliamps), when not in a sync mode of operation. To enable the USB hub 70 to switch between modes, the microcontroller is programmed to sense when the computer 72 is attached to port 78A. If the computer is attached to port 78A the microcomputer 82 will cause the power controller 84 to provide 100 milliamps of charging power to each of the HEDs connected to the ports 74. Optionally, the power may also be provided to the computer 72 via port 78A.

When the computer 72 is disconnected from the hub, the microcontroller will cause the hub 70 to enter charging mode, during which the power controller 84 is enabled to provide 500 milliamps of charging power to each of the HEDs connected to the ports 74. Thus, the microcontroller may enable the HEDs to be charged at a first, slower rate, while being synchronized with the computer 72 and cause the HEDs to be charged at a second, faster rate, while not being synchronized with the computer 72.

When the computer 72 is plugged into the 20 port USB hub 70, an application 88 on the computer will recognize any HED that has been plugged into one of the ports 74. For example, where the HEDs are iPods, an application such as iTunes may be used to recognize the HEDs. The application may then be used as a synchronizing mechanism to enable content 90 to be synchronized from the computer to HEDs plugged into the ports 74.

In operation, when HEDs are plugged into all of the ports and a computer 72 is connected to the 20 port USB hub, the application 88 will need to recognize each of the devices that are attached to the output ports so that it can communicate with them. Where there are too many HEDs connected to the ports, the computer may not recognize all of the devices correctly. Additionally, the process of recognizing 20 HEDs may cause the computer 72 to crash or cause the application 88 on the computer to freeze. According to an embodiment of the invention, the microcontroller 82 contains software that will hold one of the USB hubs, such as Hub 76B or 76C, in reset mode for a short period of time after the computer 72 has been connected to the hub 70. By holding one or more of the hubs 76B, 76C in reset mode, the number of HEDs visible to the computer may be reduced temporarily to schedule the manner in which the application 88 is required to recognize the HEDs. For example, the microcontroller 82 may hold the 7 port USB hub 76C in reset for a period of 30 seconds, and then release the reset to allow the application 88 to recognize the devices connected to the ports of that third hub. By scheduling the time at which the application is allowed to recognize devices connected to ports, the hub can provide visibility to many devices in a staggered manner to provide the computer with time to complete the required process of recognizing the devices.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A drawer for maintaining handheld electronic devices, comprising:
   an edge band defining a perimeter of the drawer;
   a divider structure disposed within the drawer and defining a plurality of compartments sized to hold the handheld electronic devices;
   a circuit board implementing a multi-port USB hub disposed in the drawer adjacent the divider structure, the circuit board being configured to enable handheld electronic devices disposed within the compartments of the divider structure to be both synchronized and charged; and
   a cover extending above the circuit board to protect the circuit board from contact by a user.

2. The drawer of claim 1, further comprising apertures in the edge band for connecting to glides that may be used to enable the drawer to extend out of or slide into an enclosure.

3. The drawer of claim 1, wherein the circuit board is disposed in a central area of the drawer.

4. The drawer of claim 1, wherein the cover has a plurality of slits sized to enable cords to extend from the circuit board to the compartments so that the handheld electronic devices may be connected to the circuit board.

5. The drawer of claim 1, further comprising a rear enclosure sized to contain power supply components that may be used to step down line current supplied to the drawer to be provided to the circuit board.

6. A drawer for maintaining handheld electronic devices, comprising:
   an edge band defining a perimeter of the drawer;
   a divider structure disposed within the drawer and defining a plurality of compartments sized to hold the handheld electronic devices; and
   a circuit board implementing a multi-port USB hub disposed in the drawer adjacent the divider structure, the circuit board being configured to enable handheld electronic devices disposed within the compartments of the divider structure to be both synchronized and charged;
   wherein the divider structure is made of a soft material designed to prevent jarring movement of the drawer from being transferred from the drawer to the handheld electronic devices.

7. A storage cart for maintaining handheld electronic devices, comprising:
- an outer enclosure defining an interior area of the storage cart;
- a drawer to hold at least a subset of the handheld electronic devices while the handheld electronic devices are maintained within the storage cart, the drawer being slidably contained within the interior area of the storage cart to selectively extend out of the interior area of the storage cart to provide access to the handheld electronic devices and to retract into the interior area of the storage cart;
- the drawer comprising:
  - an edge band defining a perimeter of the drawer;
  - a divider structure disposed within the drawer and defining a plurality of compartments sized to hold the handheld electronic devices;
  - a circuit board implementing a multi-port USB hub disposed in the drawer adjacent the divider structure, the circuit board being configured to enable handheld electronic devices disposed within the compartments of the divider structure to be both synchronized and charged; and
  - a cover extending above the circuit board to protect the circuit board from contact by a user.

* * * * *